United States Patent [19]
Diekhans et al.

[11] Patent Number: 5,857,539
[45] Date of Patent: Jan. 12, 1999

[54] AUTOMATIC-STEERING APPARATUS

[75] Inventors: Norbert Diekhans, Gütersloh; Mathias Volk, Grossen Buseck; Jochen Huster; Helmut Homberg, both of Harsewinkel, all of Germany

[73] Assignee: CLAAS Kommanditgesellschaft auf Aktien, Harsewinkel, Germany

[21] Appl. No.: 826,971

[22] Filed: Apr. 9, 1997

[30] Foreign Application Priority Data

Apr. 9, 1996 [DE] Germany ......................... 196 14 028.5

[51] Int. Cl.[6] ...................................................... B62D 5/04
[52] U.S. Cl. ................................. 180/401; 180/DIG. 900
[58] Field of Search ................................ 180/DIG. 900, 180/401

[56] References Cited

U.S. PATENT DOCUMENTS

| | | | |
|---|---|---|---|
| 3,946,825 | 3/1976 | Gail | 180/79.2 |
| 4,582,155 | 4/1986 | Ohe | 180/444 |
| 5,010,719 | 4/1991 | Korthuis | 56/10.2 |
| 5,019,983 | 5/1991 | Schutten et al. | |
| 5,234,070 | 8/1993 | Noah et al. | 180/169 |

FOREIGN PATENT DOCUMENTS

| | | | |
|---|---|---|---|
| 2 412 337 | 10/1974 | Germany . | |
| 5-338463 | 12/1993 | Japan | 180/900 |
| 5-338464 | 12/1993 | Japan | 180/900 |

*Primary Examiner*—Anne Marie Boehler
*Assistant Examiner*—Michael Cuff
*Attorney, Agent, or Firm*—Browdy and Neimark

[57] ABSTRACT

An automatic-steering apparatus for an agricultural machine (1), has at least one locating apparatus (OV), particularly an apparatus that locates the edge of the crop or row, whose locating signal (OS) is compared, as an analog voltage value (nominal value), to a wheel-angle signal (RWS), as a further analog voltage value (actual value), that has been received by a wheel-position sensor (RSS) on a steerable wheel (HR) of the agricultural machine (1), in an analog regulating apparatus (ST). The regulating apparatus (ST) emits, as a function of the difference between the nominal and actual values, at least one steering-hydraulics control signal (SHL, SHR; LIS) to an electrically-controlled steering hydraulics (LH) having a steering cylinder (LZ) that is connected to steerable wheels (HR) of the agricultural machine (1) so as to steer them. A speed signal (VS) corresponding to the driving speed of the agricultural machine (1) controls the regulating apparatus (ST) such that, the higher the speed, the smaller the steering-hydraulics control signal (SHL, SHR, LIS).

5 Claims, 3 Drawing Sheets

AUTOMATIC-STEERING APPARATUS

FIELD OF THE INVENTION

The invention relates to an automatic-steering apparatus, particularly for an agricultural machine.

REVIEW OF THE RELATED TECHNOLOGY

Agricultural machines often include an automatic-steering apparatus, having at least one locating apparatus, particularly for locating the edge of a crop or a row, whose locating signal is compared, as an analog voltage value (nominal value), to a wheel-angle signal, as a further analog voltage value (actual value), that is received by a wheel-position sensor on a steerable wheel of the agricultural machine, with the regulating apparatus emitting, as a function of the difference between the nominal and actual values, at least one steering-hydraulics control signal to an electrically-controlled steering hydraulics having a steering cylinder connected to steerable wheels of the agricultural machine so as to steer them.

Automatic-steering apparatuses of this type have been used in practice for many years. They are typically installed in field mowers for harvesting corn, or in combines. With these automatic-steering apparatuses, it is possible to automatically remain exactly on course, for example along the edge of a field of grain, or a row of corn, during a harvesting job. In conventional combines, for example, it was found that the operator had to devote about 60% of his attention to steering the machine. Steering is an especially arduous task, because steering with the rear wheels requires a relatively long correction time until a lateral change in the combine's position with respect to the crop edges takes place, after which a corresponding counter-steering must be implemented to re-establish travel in a straight line. By practically relieving the operator completely of this stress, automatic steering generally permits faster driving and virtually complete utilization of the sickle width, up to a guard distance of 10 to 20 cm.

In the known automatic-steering apparatuses, the sensitivity of the regulation and thus the regulating behavior of the automatic-steering apparatus, that is, the driving behavior of the agricultural machine, can usually be altered by a change in the amplification of the nominal value, the actual value or the steering-hydraulics control signal through the setting of a simple potentiometer. To keep the steering system stable, even at high harvesting speeds, the sensitivity and hence the maximum permissible wheel angle must be limited. This predetermines the minimum drivable curve radius. For this reason, the machine must be driven with high precision into a new row of corn, for example, or the operator must deactivate the automatic steering and steer manually. In setting the sensitivity of the system, a compromise must therefore be found between sufficient stability, even at high harvesting speeds, and the largest possible maximum permissible wheel angle to avoid limiting the minimum drivable curve radius too severely. If the driving speed for which the steering system is set is exceeded during a harvesting job, in the worst-case scenario, the harvesting machine can no longer maintain its course, that is, it can no longer follow the row of corn, for example, and veers to the side. For this reason, many operators do not even adjust the wheel-angle limitation or sensitivity, but instead do not use the automatic steering system.

OBJECT AND SUMMARY OF THE INVENTION

It is therefore the object of the invention to provide an automatic-steering apparatus of the type mentioned at the outset, which has a simple and economical design and effects stabile regulation, even at high harvesting speeds, and in which the maximum permissible wheel angle is as large as possible at low speeds; in other words, a fixed limitation is no longer necessary.

This object is accomplished in that a speed signal corresponding to the driving speed of the agricultural machine controls the regulating apparatus such that, the higher the speed, the smaller the steering-hydraulics control signal.

The automatic-steering apparatus of the invention always automatically sets the regulating sensitivity adapted to the respective driving speed. At low speed it is possible for the wheel angle to be very large, and thus for the turning radius to be small, which significantly facilitates entering the new row.

Preferably, the higher the driving speed, the less the locating signal is amplified, or the more drastically the wheel-angle signal is adjusted, or the less the steering-hydraulics control signal is amplified. Because of the simple installation of a corresponding amplifier stage into the respective signal line, or because of a simple change in the amplifier used heretofore, the automatic-steering apparatus already present in the machine need not be changed extensively, which is particularly economical. In addition, existing automatic-steering apparatuses that are already in operation can be easily retrofitted. Of course, if desired, it is also possible to influence a plurality of signals simultaneously, rather than only one, using corresponding amplifier stages.

Moreover, it is advantageous if a reference control signal that can be selected by the operator and which predetermines a neutral setting of the steering-hydraulics control signal is supplied to the regulating apparatus. This reference control signal can, of course, also be amplified as a function of the speed signal, if desired.

In a particularly economical design, the speed signal is generated by a pulse generator and guided into a counter. The count is periodically transferred into a register. The outputs of the register then correspondingly connect a resistor network that determines the amplification of the signal to be influenced. For this purpose, a conventional amplifying component connected by corresponding load resistors is simply inserted into the signal line of the signal to be influenced. One of these load resistors is replaced, as a variable resistor, by the resistor network.

In the simplest, most economical version, the resistor network is formed from a series connection of resistors graduated by binary value and bridged directly by electric switch contacts actuated by the register outputs. In this instance, a linear dependence exists between speed and amplification.

In another version, the register outputs are guided to a code converter whose outputs are connected in increasing number and sequence as the binary-coded speed signal increases. These outputs then actuate a resistor network comprising a series connection of resistors graduated by value according to a special desired amplification characteristic.

With this measure, very large wheel angles are only permissible at low speeds, for example, and the sensitivity of speed to be extrapolated in linear fashion is changed in the actual operating-speed ranges.

Of course, it is also possible to first count the pulse generator pulses and thus actuate a conventional digital potentiometer using a single-board computer or a PIC module. As an alternative, it is also possible to use a frequencyvoltage converter to convert the speed pulses, and convert this voltage into stages using a decoder module and correspondingly switch resistors on and off with a relay. Analog switches can also be used for switching the resistors on and off.

BRIEF DESCRIPTION OF THE DRAWING FIGURES

The above and other objects and the nature and advantages of the present invention will become more apparent from the following detailed description of an embodiment[s] taken in conjunction with drawings, wherein.

DETAILED DESCRIPTION OF THE PREFERRED EMBODIMENT

Figure 1:
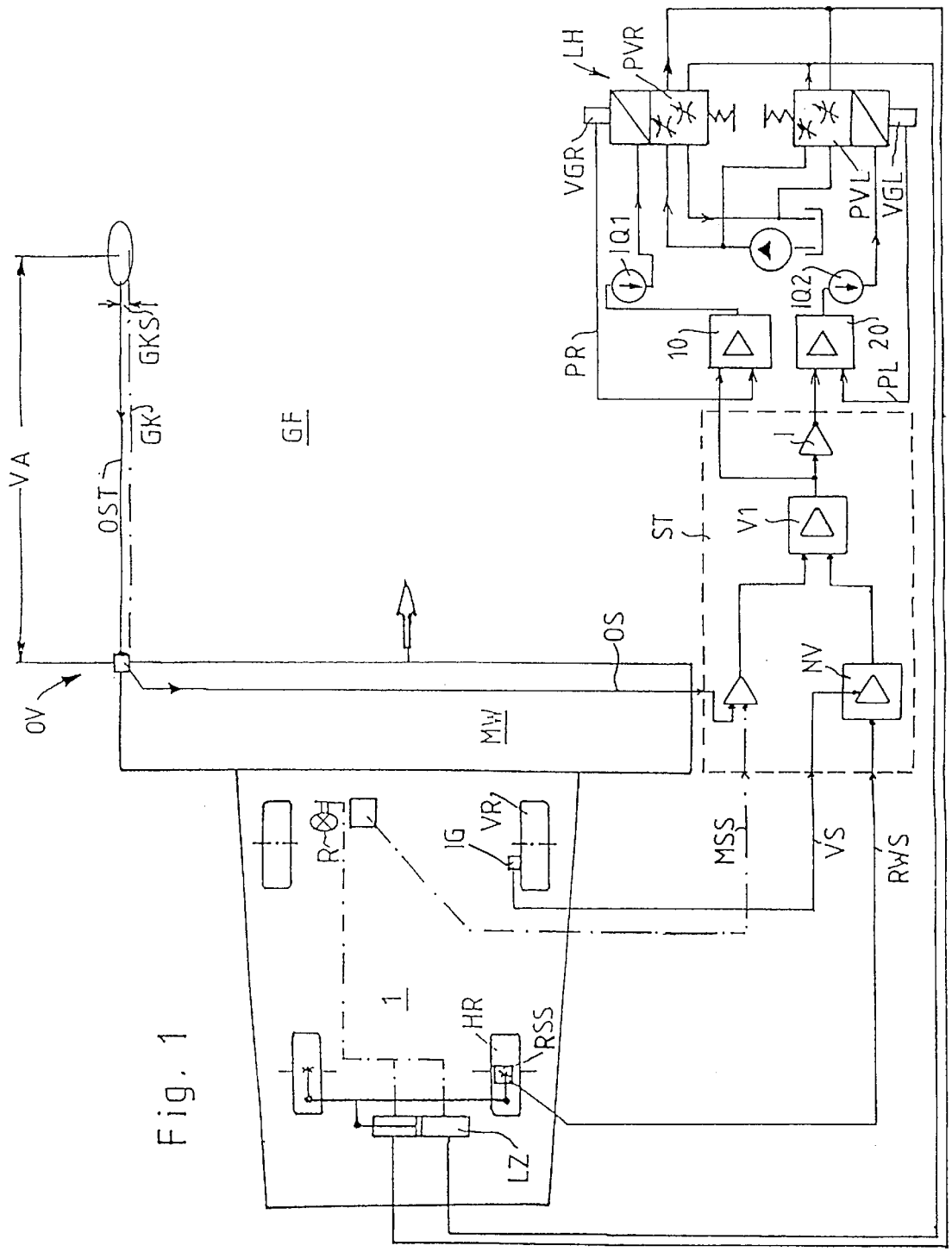
FIG. 1 is a block-diagram overview of a combine having an automatic-steering apparatus.

FIG. 1 shows a combine (1) having a cutter bar (MW), which is intended to travel, with automatic steering, along a grain edge (GK) of a grain field (GF) while deviating as little as possible from a predetermined position (GKS) to the side of the grain edge. Disposed above the cutter bar (MW) is a locating device (OV), whose locating beam (OST) is oriented along the grain edge (GK) and whose locating signal (OS) is supplied to a regulating apparatus (ST). The regulating apparatus (ST) further receives a speed signal (VS) from the front wheels (VR). The operator can predetermine a reference control signal (MSS) for the regulating apparatus (ST), which signal defines the neutral setting of the automatic-steering apparatus.

The steering-hydraulics cylinder (LZ) is actuated by the regulating apparatus (ST) by means of two proportional valves, of which one is a left control valve (PVL) and the other a right control valve (PVR); their hydraulic outputs act upon the present steering hydraulics, which effects the deflection of the rear wheels (HR). A wheel-angle signal (RWS) is tapped by a wheel-position sensor (RSS) on the steering apparatus, and supplied to the regulating apparatus (ST). The steering-control valves (PVL, PVR) are self-locking due to spring loading, so they are closed in the event of a power failure. In this state, the known hydraulic control effects steering directly from the steering wheel (R).

The actuation of the steering cylinder (LZ) is symmetrical. The two cylinder regions are respectively connected to one of the two proportional valves (PVL, PVR). These valves each have a valve-position setter (VGL, VGR) whose direction signals (PL, PR) are negatively fed back to an associated regulator (10, 20). The regulators (10, 20) are proportional amplifiers, for example, to which the left or right control signal (SHL, SHR) is supplied at the respective other output, and whose output is preferably connected by way of a current source (IQ1, IQ2) to the control electromagnet of the associated proportional valve (PVL, PVR).

These electromagnets respectively operate counter to a restoring spring. Without current, the two valves (PVL, PVR) are thus closed, and the directly-acting hydraulics of the steering wheel (R) can act uninfluenced on the steering cylinder (LZ) in this neutral state.

The left or right control signal (SHL, SHR) is respectively generated by a regulating apparatus (ST). As the nominal value, the locating signal (OS) enters the regulating apparatus (ST) as an analog voltage value. As the actual value, the wheel-angle signal (RWS) generated by the wheel-position sensor (RSS) likewise enters the regulating apparatus (ST) as an analog voltage value. The two analog voltage values are compared in a comparator component (V1), and a corresponding output value is generated that is transmitted directly to the input of the one regulator (10) and to the input of the other regulator (20) after being inverted by an inverter (I). In the present case, the locating signal is coupled by a reference control signal that can be predetermined by the operator and that predetermines a neutral setting of the overall automatic-steering apparatus.

For speed-dependent control, a speed signal (VS) tapped at the front wheel (VR) is likewise fed into the regulating apparatus (ST). In a specially-designed normalizing amplifier (NV, NV', NV*) of the regulating apparatus (ST), the wheel-angle signal (RWS) is amplified as a function of the speed signal (VS). The normalizing amplifier (NV, NV', NV*) in this case is designed such that, the higher the speed, the greater the amplification of the wheel-angle signal (RWS). This increases the sensitivity of the regulating system and reduces the maximum permissible wheel angle, the end result of which is a lesser degree of steering at the same intensity of the locating signal (OS).

The speed signal (VS) is generated by a pulse generator, e.g. an inductive voltage generator, built onto the rear wheel of the agricultural machine (MD) or directly onto the gear box of the agricultural machine (MD). The speed signal thus represents the actual ground speed rather than a nominal speed. Following a possible pre-processing of the signals to improve the signal shape, the speed signal (VS) is supplied directly to the normalizing amplifier circuit (NV, NV', NV*)

The primary component of the normalizing amplifier circuit (NV, NV', NV*) is a counter (CT1), which counts the pulses of the speed signal (VS) within a specific gate time, and whose count is periodically transferred into a register (RG). The counter (CT1) and the register (RG) are actuated by a clock signal (TS).

The information about the speed signal (VS) is then present in binary form at the outputs (Qa, Qb, Qc, Qd) of the register (RG). A resistor network (RNW) is connected with the outputs (Qa, Qb, Qc, Qd). This voltage divider (RNW) forms a load resistor of an amplifying component (V) for amplifying the wheel-angle signal (RWS).

Figure 2:
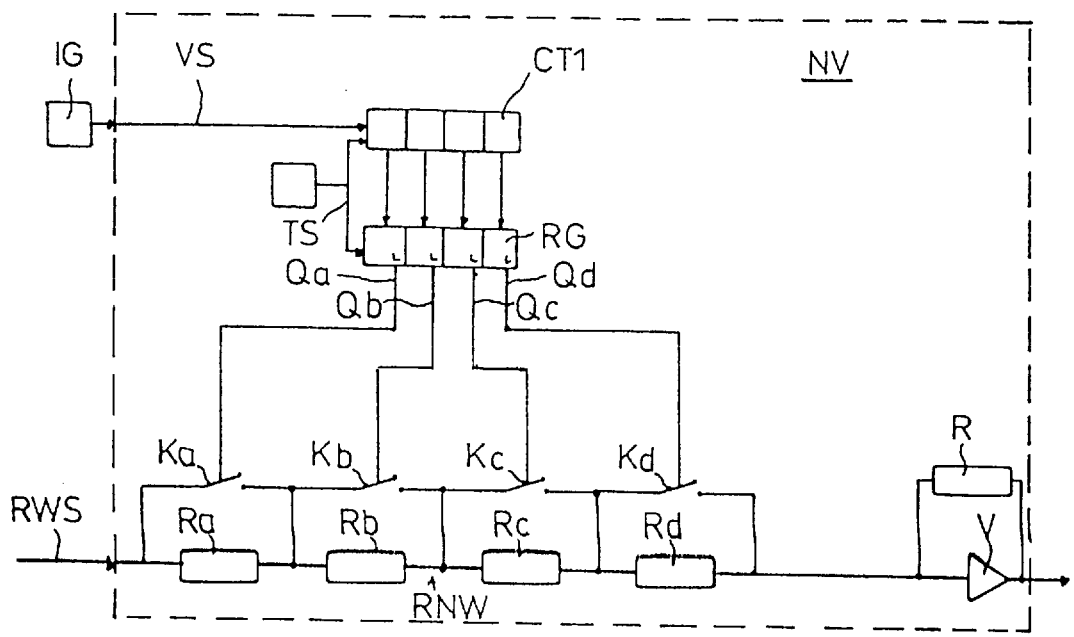
FIG. 2 is a schematic view of a first embodiment, a detailed block diagram of the normalizing amplifier, in which the wheel-angle signal is amplified corresponding to the arriving speed signal.

In accordance with the embodiment of FIG. 2, the resistor network (RNW) in the normalizing amplifier circuit (NV) comprises a series connection of resistors graduated by binary value. These resistors are bridged directly by electric switch contacts (Ka, Kb, Kc, Kd) actuated by the register outputs (Qa, Qb, Qc, Qd).

Figure 3:
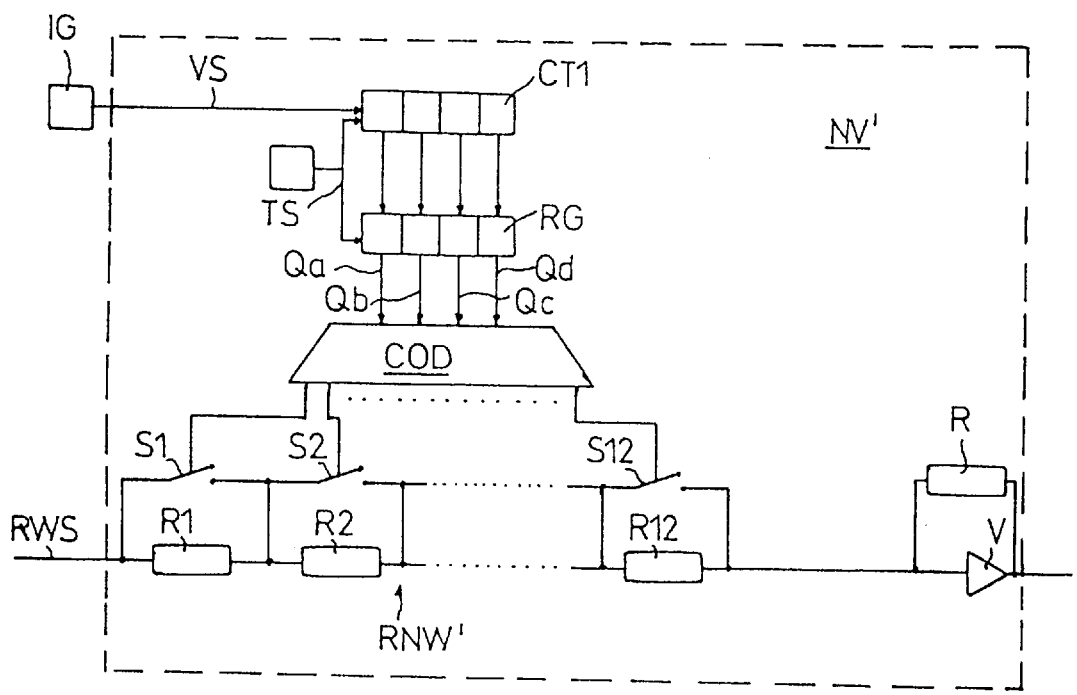
FIG. 3 depicts second embodiment, a block diagram of a normalizing amplifier.

In accordance with a second embodiment, shown in FIG. 3, the outputs (Qa, Qb, Qc, Qd) of the register (RG) are first applied to a code-conversion circuit (COD). The codes of the output values (Qa, Qb, Qc, Qd) of the register are converted into twelve output signals in the code-conversion circuit (COD) corresponding to the following linkage equation, where "+" stands for an "OR" linkage and "*" stands for an "AND" linkage:

S1=Qa+Qb+Qc+Qd
S2=Qb+Qc+Qd
S3=(Qa*Qb)+Qc+Qd
S4=Qc+Qd
S5=(Qa+Qb)*Qc+Qd
S6=(Qb*Qc)+Qd
S7=(Qa*Qb*Qc)+Qd
S8=Qd
S9=(Qa+Qb+Qc)*Qd
S10=(Qb+Qc)*Qd
S11=(Qa*Qb*Qd)+(Qc*Qd)
S12=Qc*Qd.

In an economical embodiment of the present invention, the code-conversion circuit (COD) comprises "AND" —4081 and "OR" —4071 CMOS components, which were switched one behind the other corresponding to the equations. The twelve outputs of the code-conversion circuit (COD) each control an analog switch (S1, S2, S3, S4, S5, S6, S7, S8, S9, S10, S11, S12). The advantage of the code conversion from four binary output signals to 12 output signals is that it permits differentiated graduation in the setting of the amplification. A corresponding selection of the counter gate times allows each switch to represent exactly one differential speed of one km/h, so that each speed from one to 12 km/h is represented by the corresponding number of switches (S1 through S12) switched one behind the other. This type of limitation of up to 12 km/h typically suffices for such a circuit, because the maximum harvesting speed of a combine, for example, is 14 km/h at this time.

Analogously to the contacts (Ka, Kb, Kc, Kd), in the embodiment of the normalizing amplifier circuit (NV) according to FIG. 2, the switches (S1 through S12) bridge a resistor network (RNW*). This resistor network (RNW') comprises 12 individual, series-connected resistors (R1 through R12) graduated by value according to a desired amplification characteristic. Overall, the graduation is selected such that excessively-large wheel angles are only permitted at low speeds. At the actual operating speeds, e.g., between five km/h and 12 km/h in the combine, the wheel-angle signal (RWS) is reduced in linear fashion with increasing speed. In the event that the speed is to be varied within a large range, or smaller-scale graduation is necessary, it is also possible, of course, to increase the number of graduations arbitrarily with a correspondingly increased outlay for circuitry, for example larger counters and registers.

Figure 4:
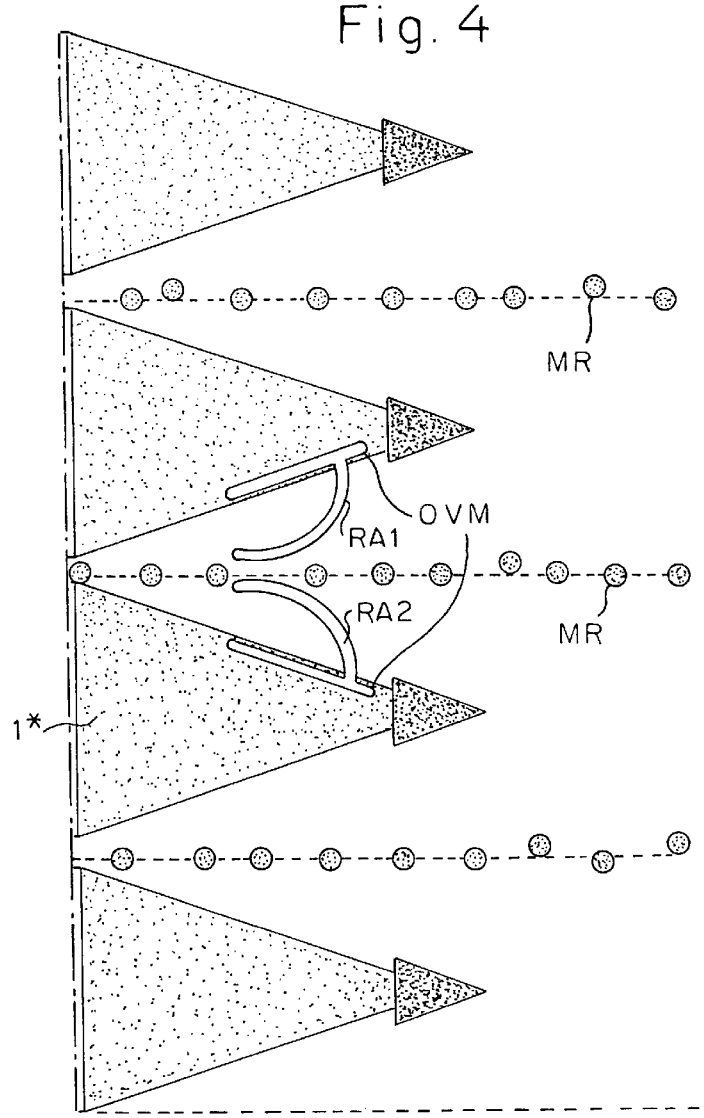
FIG. 4 is a plan view of a corn harvester having a locating apparatus.

FIG. 4 shows another embodiment of a locating apparatus (OV) on the harvesting implement of a corn harvester (1*). In this instance, sensors (RA1, RA2) are disposed in a manner known per se on the cutting tool supports such that their ends scan a row of corn (MR) and, if an asymmetrical deflection is occurring, transmit corresponding locating signals (OV) for a right or left correction.

Figure 5:
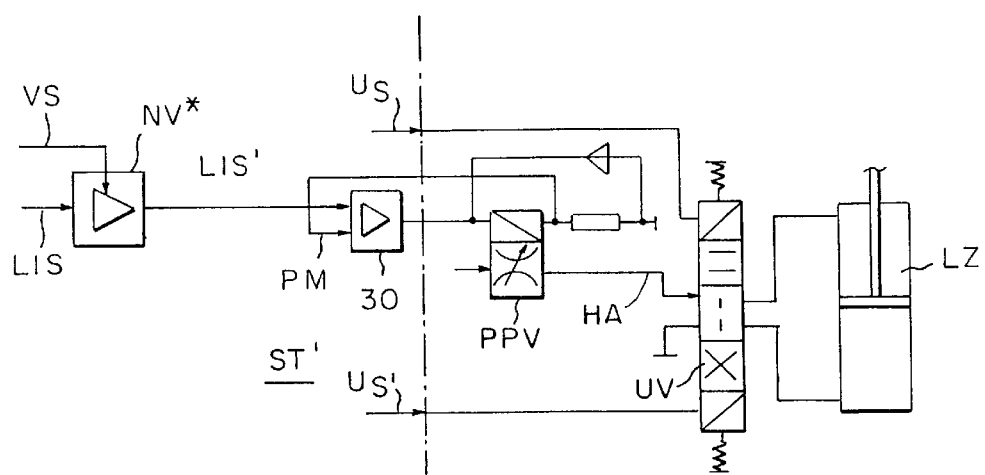
FIG. 5 is a block diagram of a proportional-valve arrangement, as an alternative to the embodiment in FIG. 1, for converting the steering-hydraulic control signals into the steering movement.

FIG. 5 shows an alternative hydraulic-steering control. The first-order regulating apparatus (ST') generates, on the one hand, a steering-intensity signal (LIS) and, on the other hand, right-left reversing signals (US, US'). The intensity signal (LIS) is first amplified in a normalizing amplifier circuit (NV*) as a function of the speed signal (VS). The normalizing amplifier circuit (NV*) here is designed such that, the higher the speed, the less the intensity signal is amplified. The intensity signal (LIS') modified in this way acts, as the nominal signal, on the second-order current regulator (30), which actuates the restoring-spring-loaded control magnet of the proportional valve (PPV) on the output side. The hydraulic-valve output (HA) is connected to the steering cylinder (LZ), parallel to the hydraulic return line, by way of a three-position reversing valve (UV), so as to actuate the cylinder to steer to the right or left, depending on the valve position. By means of restoration of the spring, the reversing valve (UV) assumes the blocking center position, from which the reversing signals (US) bring the control slide into the steering positions via magnets actuated by this action. In the currentless center position, the direct steering can be implemented unhindered at the steering cylinder (LZ). The electrically-controlled 3-position valve (UV) is configured for forward and return flux, i.e., it has two channels.

In an embodiment, not shown, of a hydraulic-steering control, fast-acting magnet valves are respectively actuated, separately for left and right, directly by the output signals from the regulating apparatus by way of a transistor.

In principle, the output signals of the regulating apparatus (ST) can also be converted into steering movements of the steering cylinder (LZ) in practically any other manner.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. In an automatic-steering apparatus for an agricultural machine (1), including:
   at least one locating apparatus (OV) means for locating an edge of a crop or row and outputting a locating signal (OS) nominal value;
   a wheel-position sensor (RSS) on a steerable wheel (HR) of the agricultural machine (1) outputting a wheel-angle signal (RWS) actual value;
   a comparator means for comparing the locating signal (OS) to the wheel-angle signal (RWS);
   an electrically-controlled steering hydraulics actuator (LH) including a steering cylinder (LZ) that is connected to steerable wheels (HR) of the agricultural machine (1) so as to steer them; and
   a regulating apparatus (ST) for emitting, as a function of the difference between the nominal value and the actual value, at least one steering-hydraulics control signal (SHL, SHR; LIS) to the electrically-controlled steering hydraulics actuator (LH);
   the improvment comprising:
   a speed sensor outputting a speed signal (VS) corresponding to the driving speed of the agricultural machine (1); and feedback-adjust means for controlling the regulating apparatus (ST) according to the speed signal (VS) such that, the higher is the speed, the smaller is the steering-hydraulics control signal (SHL, SHR, LIS);
   wherein the feedback-adjust means includes means such that the higher the driving speed, the less the locating signal (OS) is amplified.

2. In an automatic-steering apparatus for an agricultural machine (1), including:
   at least one locating apparatus (OV) means for locating an edge of a crop or row and outputting a locating signal (OS) nominal value;

a wheel-position sensor (RSS) on a steerable wheel (HR) of the agricultural machine (1) outputting a wheel-angle signal (RWS) actual value;

a comparator means for comparing the locating signal (OS) to the wheel-angle signal (RSW);

an electrically-controlled steering hydraulics actuator (LH) including a steering cylinder (LZ) that is connected to steerable wheels (HR) of the agricultural machine (1) so as to steer them; and a regulating apparatus (ST) for emitting, as a function of the difference between the nominal value and the actual value, at least the steering-hydraulics control signal (SHL, SHR; LIS) to the electrically-controlled steering hydraulics actuator (LH);

the improvement comprising:

a speed sensor outputting a speed signal (VS) corresponding to the driving speed of the agricultural machine (1); and feedback-adjust means for controlling the regulating apparatus (ST) according to the speed signal (VS) such that, the higher is the speed, the smaller is the steering-hydraulics control signal (SHL, SHR, LIS);

comprising a pulse generator (IG) to generate the speed signal (VS) and a counter (CT1), and wherein the speed signal is guided into the counter (CT1) whose count is periodically transferred into a register (RG) whose outputs (Qa, Qb, Qc, Qd) correspondingly connect a resistor network (RNW, RNW') comprising means to determine an amplification of the signal (OS; RWS; SHL, SHR, LIS; MSS).

3. The improvement according to claim 2, wherein the resistor network (RNW) is formed by a series connection of resistors (Ra, Rb, Rc, Rd) graduated by binary value and bridged directly by electric switch contacts (Ka, Kb, Kc, Kd) actuated by the register outputs (Qa, Qb, Qc, Qd).

4. The improvement according to claim 2, wherein the outputs (Qa, Qb, Qc, Qd) of the register (RG) are guided to a code converter (COD) whose outputs (S1, S2, S3, S4, S5, S6, S7, S8, S9, S10, S11, S12) are connected in increasing number and sequence as the binary-coded speed signal (VS) increases, and these outputs actuate a resistor network (RNW') comprising a series connection of resistors (R1, R2, R3, R4, R5, R6, R7, R8, R9, R10, R11, R12) graduated by value according to a desired amplification characteristic.

5. The improvement according to claim 4, wherein the code converter (COD) is a circuit formed in a discrete manner from individual "AND" and "OR" components and analog switches.

* * * * *